Jan. 21, 1936. L. W. SCHRADER 2,028,295

FOAM RETARDING TUBE

Filed March 6, 1933

Leo W. Schrader Inventor

W. E. Currie Attorney

Patented Jan. 21, 1936

2,028,295

UNITED STATES PATENT OFFICE 2,028,295

FOAM RETARDING TUBE

Leo W. Schrader, Elizabeth, N. J., assignor to Standard Oil Development Company, a corporation of Delaware Application March 6, 1933, Serial No. 659,612

5 Claims. (Cl. 169—4)

This invention relates to improvements in fire fighting apparatus and more particularly to improvements in means for delivering fire foam downwardly on to the surface of the liquid without disturbing the liquid.

The invention will be fully understood from the following description taken in connection with the accompanying drawing in which latter—

Figure 1:
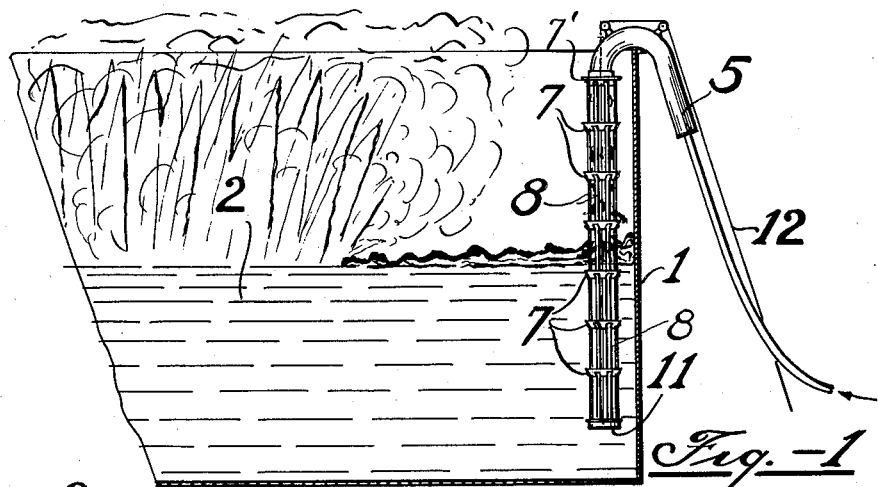
Fig. 1 is a transverse sectional view through a tank containing liquid and showing the foam delivering apparatus in side elevation.
Figure 2:
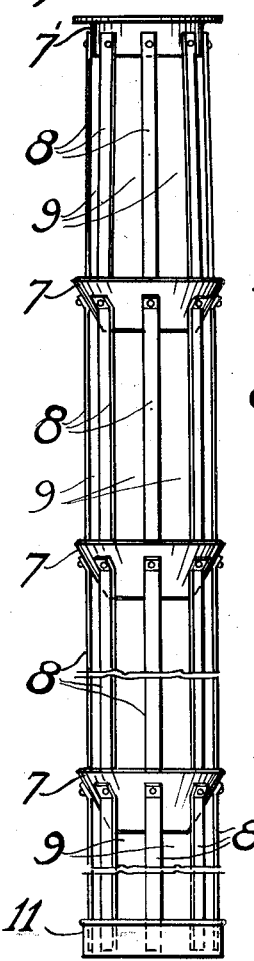
Fig. 2 is a detail side elevational view of the foam delivering apparatus.

Referring particularly to the drawing, reference numeral 1 designates a tank adapted to contain a body 2 of oil or other inflammable liquid. The structure for the purposes of illustrating the invention comprises a series of deflecting baffle members adapted to be suspended beneath the outlet of a foam delivery pipe to retard the falling of the foam as it is delivered downwardly on to the surface of oil in an oil tank.

As shown, a pipe 5 is arranged to deliver foam over the side wall 1 of the oil tank. Beneath the end of the pipe 5 are suspended a series of baffle members 7 through which the foam flows downwardly to the surface of the oil. These members are formed of a suitable shape and size to retard the fall of the foam sufficiently so that spattering of the oil as the foam reaches the surface thereof will be prevented and yet effective rapidity of flow will be maintained.

In the embodiment illustrated the baffle members 7 are formed of funnel shape converging downwardly and positioned with the lower end of one funnel longitudinally spaced from the top of the funnel next below. The funnel shaped baffle members 7 are connected together by means of a plurality of flexible members or straps 8 formed of suitable fire resistant material such as asbestos or the like. The asbestos straps may be asbestos cord reenforced with thin brass wires. The flexible members 8 are secured to the baffle members 7 in spaced relation around the periphery of the baffle members 7 forming slots 9 in the resulting conduit to permit free escape of fire foam therethrough upon the surface of the liquid.

In the embodiment illustrated, the upper portions of the straps 8 are secured to the exterior of the conical baffle members 7 and the lower portions of the flexible members 8 are secured to the interior of the adjoining conical baffle members 7. The flexible members 8 secure the upper conical baffle member to a flange 7', which is fastened to the flange 5' of nozzle 5. The conical baffle members 7 may be made of any suitable fire resistant material such as asbestos, or the like. A ring 11 of steel or other suitable relatively heavy material is carried by the flexible members 8 at the bottom of the series to provide sufficient weight to extend the tube when the nozzle has been positioned over the edge of the tank 1.

Figure 3:
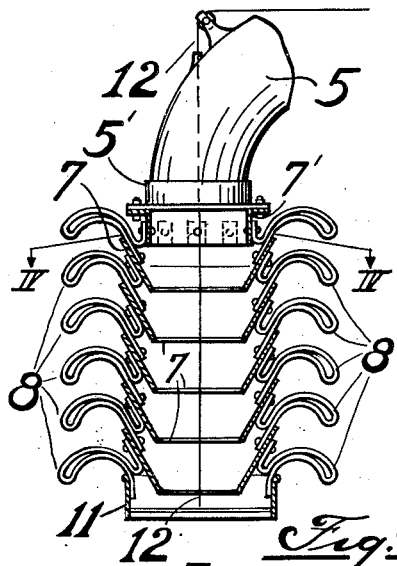
Fig. 3 is a transverse sectional view of the foam delivering apparatus in its contracted position for transportation to the scene of the fire.
Figure 5:
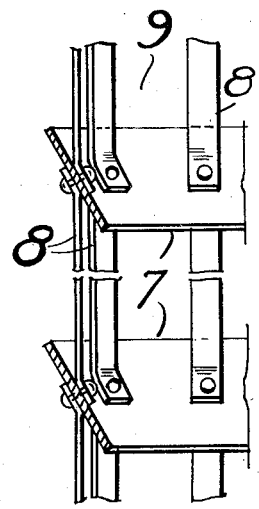
Fig. 5 is a transverse sectional view through the funnel shaped members showing their connection to the flexible members.
Figure 4:
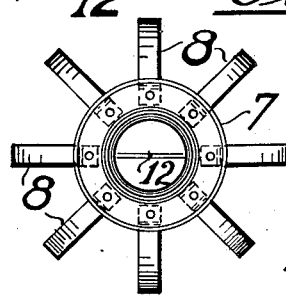
Fig. 4 is a top plan view taken along the line IV—IV of Fig. 3.

The several conical baffle members 7 may conveniently be suspended from the delivery end of the foam nozzle 5 by means of a wire cable 12 or other suitable flexible material extending from the nozzle 5 to the weighted ring 11. As will be clear from the drawing (Figs. 3 and 4), all of the conical baffle members can be readily telescoped and collapsed into a compact unit at the foam nozzle 5 for convenience in handling and movement over the top of the wall of the tank.

By the construction described a foam retarder is provided which is relatively short and light. It can be placed over the edge of a burning tank relatively easily. The foam retarder drops vertically into the liquid upon being released by the pull cord or by a self-igniting device. The foam retarder always extends to the surface of the burning oil and except where the oil level is very low extends below the surface. The series of vertically disposed baffle rings separated by straps allow the expanded foam to drop the height from the foam nozzle delivering the foam to the surface of the burning oil without attaining too great a velocity. The foam at or near the oil surface then passes out through the spaces between the straps and covers the surface of the oil at this point. A relatively small amount of foam is needed to extinguish a fire since the foam in hitting the oil surface does not become covered with burning oil.

Various changes may be made within the scope of the appended claims in which it is desired to claim all novelty inherent in the invention as broadly as the prior art permits.

I claim:

1. A conduit for delivering fire foam adapted to be suspended within a tank by its upper end with its lower end submerged in the contents of the tank, comprising an upper section having an annular collar for a foam delivery nozzle, a plurality of strips of substantial length, formed of a non-combustible material, affixed by their upper ends at spaced intervals around the collar and an inverted frusto conical foam retarding member to which the lower ends of said strips are affixed at an intermediate point around the inner surface thereof, intermediate sections each comprising a plurality of strips of substantial length, formed of non-combustible material and an inverted frusto conical foam retarding member, the lower ends of said strips in each section being affixed at spaced intervals around the inner surface of the frusto conical member and at an intermediate point thereon, each section being attached to the one above by affixing the upper ends of the non-combustible strips at spaced intervals around the outer surface and at an intermediate point thereon, of the frusto conical member in the section above, and a bottom section comprising a plurality of strips of substantial length, formed of non-combustible material, affixed by their upper ends at spaced intervals around the outer surface, and at an intermediate point thereon, of the frusto conical member of the lower-most intermediate section and by their lower ends at spaced intervals around an annular weight or stabilizer for the tube.

2. In an apparatus for delivering fire foam vertically downward onto the surface of a liquid, a conduit comprising a series of light weight, shallow, vertically arranged funnel shaped members and a plurality of flexible members of which the upper end of each flexible member is secured to the outer surfaces of a funnel shaped member and the lower end of each flexible member is secured to the inner surface of a funnel shaped member in closely spaced relation to each other around the periphery of the funnel shaped members at points intermediate the upper and lower edges thereof, connecting said funnel shaped members together with the lower edge of one member in substantially spaced relation longitudinally to the upper edge of the following member and forming a slotted tube to confine the downward flow of foam, with the funnel shaped members protruding into the tube to retard the foam in its downward path.

3. A device for delivering fire foam adapted to be suspended within a tank with its lower end submerged therein comprising a plurality of narrow elongated flexible members, a series of hollow inverted frusto conical members of substantially less depth than the length of said flexible members to which the flexible members are secured at closely spaced intervals annularly of said frusto conical members and at points intermediate the upper and lower edges thereof with the upper and lower ends respectively of said flexible members engaging the outer surface of one frusto conical member and the inner surface of the frusto conical member next below to form a flexible conduit comprising a series of slotted passageways for the foam separated by said frusto conical members with said members spaced a substantial distance longitudinally one from the other and with the lower end of each member protruding into the passageway beneath it and the upper end extending beyond the wall of the passageways above and below it.

4. In an apparatus for delivering fire foam, a conduit comprising a series of flexible slotted passageways for the foam having a common longitudinal axis and a series of hollow inverted frusto conical foam retarding members of a depth substantially less than the length of the passageways and of which members the lower ends are of substantially smaller diameter and the upper ends of substantially greater diameter than the diameter of the passageways, secured between said passageways and separating one passageway from the other.

5. In an apparatus for delivering fire foam, a series of downwardly converging funnel shaped members joined together, with the lower end of one member substantially above the upper end of the next member, by means of a plurality of narrow elongated straps secured at closely spaced intervals around the upper and lower surfaces of the funnel shaped members substantially midway the depth of said members with each strap connected from the outer surface of one funnel shaped member to the inner surface of the next lower funnel shaped member, whereby a flexible slotted conduit for the foam is formed comprising a series of tubular passageways with the lower ends of the funnel shaped members protruding into the passageways sufficiently far to retard the fall of foam through the conduit.

LEO W. SCHRADER.